US011692059B2

(12) United States Patent
Kai et al.

(10) Patent No.: US 11,692,059 B2
(45) Date of Patent: Jul. 4, 2023

(54) KETONE-ALDEHYDE MODIFIED RESIN AND THE PREPARATION PROCESS THEREOF

(71) Applicant: Guangdong Huaran Paints Co., Ltd., Guangdong Sheng (CN)

(72) Inventors: Weihua Kai, Guangdong Sheng (CN); Xi Zhao, Guangdong Sheng (CN); Shiqi Xie, Guangdong Sheng (CN)

(73) Assignee: Guangdong Huarun Paints Co., Ltd.

(*) Notice: Subject to any disclaimer, the term of this patent is extended or adjusted under 35 U.S.C. 154(b) by 423 days.

(21) Appl. No.: 15/733,474

(22) PCT Filed: Feb. 8, 2019

(86) PCT No.: PCT/IB2019/000155
§ 371 (c)(1),
(2) Date: Aug. 5, 2020

(87) PCT Pub. No.: WO2019/155287
PCT Pub. Date: Aug. 15, 2019

(65) Prior Publication Data

US 2021/0115190 A1 Apr. 22, 2021

(30) Foreign Application Priority Data

Feb. 8, 2018 (CN) ........................ 201810139764.7

(51) Int. Cl.
*C09D 7/80* (2018.01)
*C08G 63/78* (2006.01)
*C08G 63/48* (2006.01)
*C09D 5/02* (2006.01)
*C09D 167/08* (2006.01)

(52) U.S. Cl.
CPC ............ *C08G 63/78* (2013.01); *C08G 63/48* (2013.01); *C09D 5/028* (2013.01); *C09D 7/80* (2018.01); *C09D 167/08* (2013.01)

(58) Field of Classification Search
USPC .......................................................... 528/227
See application file for complete search history.

(56) References Cited

U.S. PATENT DOCUMENTS

| | | | | |
|---|---|---|---|---|
| 3,283,030 | A | 11/1966 | Bean, Jr. et al. | |
| 8,758,862 | B2 * | 6/2014 | Abrami ................ | C09D 175/04 427/407.1 |
| 2005/0043501 | A1 | 2/2005 | Glockner et al. | |
| 2016/0289366 | A1 | 10/2016 | Duerr et al. | |

FOREIGN PATENT DOCUMENTS

| | | | |
|---|---|---|---|
| CN | 1869086 | A | 11/2006 |
| CN | 101173114 | A | 5/2008 |
| CN | 101353546 | A | 1/2009 |
| CN | 104086712 | A | 10/2014 |
| CN | 104497814 | A | 4/2015 |
| CN | 104946098 | A | 9/2015 |
| CN | 105062341 | A | 11/2015 |
| CN | 106046281 | A | 10/2016 |
| DE | 2438712 | | 2/1976 |
| WO | 01/92434 | A1 | 12/2001 |
| WO | 2009/013064 | A2 | 1/2009 |

OTHER PUBLICATIONS

International Patent Application No. PCT/IB2019/000155 filed Feb. 8, 2019, International Search Report and Written Opinion dated Jun. 27, 2019, 9 pages.
International Patent Application No. PCT/IB2019/000155, filed Feb. 8, 2019, International Preliminary Report on Patentability dated Aug. 11, 2020, 6 pages.
Chinese Patent Application No. 201810139764.7, filed Feb. 8, 2018, Office Action and Search Report dated Nov. 26, 2020, 9 pages.
Extended European Search Report for European application No. 19751426.8, dated Dec. 21, 2021 (6 pages).

* cited by examiner

*Primary Examiner* — Terressa Boykin

(57) ABSTRACT

The present invention discloses a ketone-aldehyde modified resin and the preparation process thereof. The ketone-aldehyde modified resin comprises a ketone-aldehyde modified unsaturated polyester, a ketone-aldehyde modified unsaturated alkyd or the combination thereof, and wherein the said resin has ketone-aldehyde moieties. The process of the said resin comprises the steps of: reacting unsaturated polyester-forming and/or unsaturated alkyd resin-forming monomer components with a ketone-aldehyde resin. The present invention also discloses a coating composition comprising the said resin as well as a coated article. The ketone-aldehyde modified resin and the coating composition achieve significantly improved fast drying effect, while other properties are not observably impaired or even improved.

15 Claims, No Drawings

KETONE-ALDEHYDE MODIFIED RESIN AND THE PREPARATION PROCESS THEREOF

This application claims the benefit of Chinese priority application number 201810139764.7, filed on 8 Feb. 2018, the entirety of which is hereby incorporated by reference.

TECHNICAL FIELD

The present disclosure refers to a ketone-aldehyde modified resin and a preparation process thereof. The present disclosure further refers to a coating composition comprising the ketone-aldehyde modified resin and a coated article.

BACKGROUND

Polyester and alkyd resins are commonly used room temperature curing resins. Polyester and alkyd resins have a wide range of applications due to their low cost, high gloss, high flexibility, and good weatherability. Conventional alkyds are cured by auto-oxidation crosslinking. The unsaturated fatty acid or methylene group in the oil is oxidized by air into peroxides which are subsequently decomposed into free radicals to crosslink the alkyd resin.

Although polyester and alkyd resins can be used for room temperature curing, the curing speeds of the conventional polyester and alkyd resins are still not fast enough at room temperature. The inherently slow drying speeds limit their applications in industrial coatings.

Several methods have been proposed to improve the drying speed of alkyd resins. One method is to modify the alkyd with an acrylic monomer. However, such acrylic modified alkyd resins generally have a very high molecular weight and require the addition of a very large amount of solvent to reduce the viscosity to an operable level. Further, acrylic resins have very bad compatibility with alkyd resins, resulting in significantly reduced properties such as the gloss of the acrylic modified alkyd resins. Another method is to modify the alkyd resin with a phenolic resin. However, a phenol resin contains a large amount of hydroxyl groups and phenolic rings, so that the resulting phenolic modified alkyd resin has poor weather resistance.

Accordingly, there remains a need in the art for a resin having improved fast drying properties while other properties (e.g., gloss, weatherability, etc.) are not observably impaired or even improved.

SUMMARY

The first aspect of the present disclosure provides a process for the preparation of a ketone-aldehyde modified resin, comprising the steps of: reacting unsaturated polyester-forming and/or unsaturated alkyd resin-forming monomer components with a ketone-aldehyde resin, to obtain the ketone-aldehyde modified resin.

The second aspect of the present disclosure provides a ketone-aldehyde modified resin, wherein the ketone-aldehyde modified resin comprises a ketone-aldehyde modified unsaturated polyester, a ketone-aldehyde modified unsaturated alkyd or the combination thereof, and wherein the ketone-aldehyde modified resin has ketone-aldehyde moieties.

The third aspect of the present disclosure provides a coating composition, comprising the ketone-aldehyde modified resin as described herein.

The fourth aspect of the present disclosure provides a coated article, having at least one surface on which the ketone-aldehyde modified resin as described herein, the ketone-aldehyde modified resin obtained by the process as described herein, or the coating composition as described herein is applied.

The inventors have surprisingly found that the ketone-aldehyde modified resin of the present disclosure has significantly improved fast-drying properties, while other properties (such as gloss, weather resistance, etc.) are not significantly impaired or even improved. The process of the present disclosure is simple and practicable, and requires no addition of additional catalyst.

Details of one or more embodiments of the invention are set forth in the description below. Other features, objects, and advantages of the invention will be apparent from the description and appended claims.

Definitions

As used herein, “a”, “an”, “the”, “at least one”, and “one or more” are used interchangeably, unless indicated otherwise. Thus, for example, a coating composition that comprises “an” additive can be interpreted to mean that the coating composition includes “one or more” additives. The use of the singular form herein intended to include the corresponding plural form.

Throughout the present disclosure, where compositions are described as having, including, or comprising specific components or fractions, or where processes are described as having, including, or comprising specific process steps, it is contemplated that the compositions or processes as disclosed herein do not exclude other optional components or steps that are not specifically mentioned in this disclosure, but also it is contemplated that the compositions or processes may consist essentially of, or consist of, the recited components or steps.

In the present disclosure, the recitation of numerical ranges by endpoints includes all numbers within that range. For example, the range of 1 to 5 includes the values of such as 1, 1.5, 2, 2.75, 3, 3.80, 4, 5 and the like). In addition, the described numerical ranges include all subsets of ranges within the broader numerical ranges. For examples, the range of 1 to 5 includes the subsets of ranges of such as 1 to 4, 1.5 to 4.5 and 1 to 2 and the like.

In addition, for the sake of brevity, only certain ranges are explicitly disclosed herein. However, it should be understood that the combinations of any lower limit with any upper limit belong to the disclosure of the present invention; the combinations of any lower limit with other lower limits belong to the disclosure of the present invention, and likewise, the combinations of any upper limit with other upper limits are also explicitly disclosed in the present invention. Additionally, within a range includes every point or individual value between its end points even though not explicitly recited, unless indicated otherwise. Thus, every point or individual value may serve as its own lower or upper limit combined with any other point or individual value or any other lower or upper limit, to recite a range that belong to the disclosure of the present invention.

The terms “preferred” and “preferably” refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, in the context of "modified resin", the term "modification" or "modified" means that the chemical structure of the resin is partially changed by a chemical reaction, or the modified subject is covalently bonded to the resin by a chemical reaction. In this context, there is an essential difference between the terms "modification" and "physical mixing."

As used herein, the term "hydroxyl value" refers to the number of milligrams of potassium hydroxide equivalent to the hydroxyl content per gram of sample.

DETAILED DESCRIPTION

In the process according to the first aspect of the present disclosure, the ketone-aldehyde modified resin is prepared by reacting unsaturated polyester-forming and/or unsaturated alkyd resin-forming monomer components with a ketone-aldehyde resin.

In some preferred embodiments, based on the total weight of the monomer components and the ketone-aldehyde resin, the ketone-aldehyde resin has an amount of from 1 wt. % to 99 wt. %, preferably from 3 wt. % to 80 wt. %, more preferably from 5 wt. % to 60 wt. %, even more preferably from 8 wt. % to 30 wt. %, for example 10 wt. %.

As used herein, "ketone-aldehyde resin" refers to a polymer obtained by polycondensation of ketones and aldehydes. In some preferred embodiments, the ketones used to prepare the ketone-aldehyde resin are alicyclic ketones, more preferably alicyclic ketones having cyclohexanone-based structural moiety.

In some preferred embodiments, the process according to the invention further comprises the step of providing the ketone-aldehyde resin as the products of the reaction of cyclohexanone or derivations thereof with aldehydes. More preferably, cyclohexanone or derivations thereof is selected from the group of 4-tert-amylcyclohexanone, 2-sec-butylcyclohexanone, 2-tert-butylcyclohexanone, 4-tert-butylcyclohexanone, 2-methylcyclohexanone, 3,3,5-trimethylcyclohexanone, cyclohexanone and any mixture thereof. Preferably, the aldehydes are selected from the group of formaldehyde, paraformaldehyde, acetaldehyde, n-butyraldehyde, iso-butyraldehyde, dodecanal, benzaldehyde and any mixture thereof. The most common ketone-aldehyde resin is the reaction product of cyclohexanone with formaldehyde or paraformaldehyde. The specific structure of the ketone-aldehyde resin is relatively complicated, and it is difficult to describe all suitable ketone-aldehyde resins by a certain structural formula. Herein, the resin can be more clearly characterized by defining the raw materials for preparing the resin. This characterization is very common in the polymer field. For example, as described above, the term "ketone-aldehyde resin" itself can be considered as a resin characterized by defining the raw materials. The inventors believe that the resin products characterized by defining raw materials and/or preparation methods herein are clear.

The ketone-aldehyde resin has hydroxyl groups at the side chains and the ends, so that the ketone-aldehyde resin can undergo a polycondensation reaction with carboxyl group in a monomer component for preparing an alkyd resin and a polyester resin. By adjusting the content of the hydroxyl groups at the side chain and the ends in the ketone-aldehyde resin, the compatibility of the ketone-aldehyde moiety with other moieties can be optimized, so that the ketone-aldehyde modified resin of the present invention has desired properties. In some preferred embodiments, the ketone-aldehyde resin has a hydroxyl value of 80 mgKOH/g or more, preferably 100 mgKOH/g or more, more preferably 120 mgKOH/g or more. Preferably, the ketone-aldehyde resin has a hydroxyl value of not higher than 300 mgKOH/g resin, more preferably not higher than 200 mgKOH/g resin, even more preferably 150 mgKOH/g resin.

In some preferred embodiments, the ketone-aldehyde resin has a softening point of 80-130° C., preferably 90-120° C.

The "monomer component" herein includes a monomer component for preparing an unsaturated polyester or preparing an unsaturated alkyd resin, as known in the art. For example, the monomer components herein comprise polyols; polyacids; fatty acids, fatty acid esters or naturally occurring oils; monofunctional acids other than fatty acids. In some embodiments, the monomer components comprise (a) 20 to 60 wt. % of polyols; (b) 20 to 60 wt. % of polyacids; (c) 0 to 50 wt. % of fatty acids, fatty acid esters or naturally occurring oils; and (d) 0 to 15 wt. % of monofunctional acids other than fatty acids, wherein the wt. % (i.e. weight %) is relative to the total weight of components of (a), (b), optional (c), and optional (d); and at least one of components (b) and (c) is unsaturated. Preferably, the molar equivalent ratio of the polyols to the sum of the polyacids, optionally the fatty acids, fatty acid esters or naturally occurring oils and optionally the monofunctional acids is in a range of 1:4 to 4:1, such as in a range of 1:2 to 2:1.

In the monomer component forming the above resin, the polyols may comprise one or more selected from a group consisting of a glycol, a triol, a tetrahydric alcohol, a polymer having two or more hydroxyl functional groups, and a combination thereof. In some embodiments of the invention, the polyols are selected from the group of ethylene glycol, diethylene glycol, triethylene glycol, propylene glycol, dipropylene glycol, 1,2-butanediol, 1,3-butanediol, 1,4-butanediol, pentanediol, pentaerythritol, trimethylolpropane, trimethylolethane, glycerol, dipentaerythritol, and any combinations thereof. The polyols may also comprise other polyols that can be used to prepare the resin, as known to those of ordinary skill in the art. The polyols may be used alone or in combination. The amount of the polyols may be adjusted within a suitable range, preferably in the range of 20 to 60 wt. %, more preferably in the range of 30 to 50 wt. %.

In the monomer components forming the above resin, the polyacids may comprise unsaturated polyacids and optional saturated polyacids. The unsaturated polyacids are preferably selected from the group of: fumaric acid, maleic acid, maleic anhydride, methyl fumaric acid, methylmaleic acid, dichloromaleic acid, itaconic acid and any combination thereof. The optional saturated polyacids are preferably selected from the group of: phthalic acid and anhydrides thereof, isophthalic acid, terephthalic acid, succinic acid, adipic acid, suberic acid, azelaic acid, sebacic acid, tetrachlorophthalic acid, tetrabromophthalic acid, trimellitic acid, trimellitic anhydride, pyromellitic acid, pyromellitic dianhydride and any combinations thereof. The polyacids may also comprise other polyacids or anhydrides that can be used to prepare the resin, as known to those of ordinary skill in the art. The polyacids may be used alone or in combination. The amount of the polyacids can be adjusted within a suitable range, preferably in the range of 20 to 60 wt. %, more preferably in the range of 30 to 50 wt. %.

In the monomer components forming the above resins, fatty acids, fatty acid esters or naturally occurring oils are optionally present. In embodiments where the resin is an alkyd resin, the monomer components comprise fatty acids, fatty acid esters or naturally occurring oils, which may be any fatty acid, fatty acid ester or naturally occurring oil for forming an alkyd resin, as known in the art. In a preferred embodiment, the fatty acids, fatty acid esters or naturally occurring oils are selected from the following formulas (1), (2), (3):

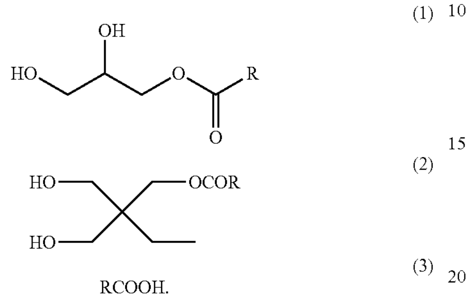

In the above formulas, R is a saturated or unsaturated $C_8$-$C_{22}$ alkyl group.

In some embodiments, the fatty acids, fatty acid esters or naturally occurring oils comprise linoleic acid, linolenic acid, oleic acid, arachidonic acid, eleostearic acid, tall oil fatty acid, catalpic acid, dehydrated ricinoleic acid, castor oil, linseed oil, soybean oil, palm oil, safflower oil, or the esters thereof. The amount of the fatty acids, fatty acid esters or naturally occurring oils may be adjusted within a suitable range, preferably in the range of 10 to 50 wt. %, more preferably in the range of 10 to 40 wt. %.

In the monomer components forming the above resins, a monofunctional acid is optionally present. Representative monofunctional acids are selected from the group consisting of benzoic acid, acetic acid, propionic acid, t-butylbenzoic acid, and any combination thereof. The monofunctional acids may be used alone or in combination. The amount of the monofunctional acids can be adjusted within a suitable range, preferably in the range of 0 to 10 wt. %, more preferably in the range of 0.1 to 5 wt. %.

Those skilled in the art will be capable of determining appropriate conditions for preparing the ketone-aldehyde modified resin, including use of the solvent, reaction temperature, reaction time, and the like, depending on the type and nature of the desired resin. As an example, in some embodiments, the reaction is carried out at 160-220° C. for 10-20 hours (e.g., 15 hours) in the optional presence of a solvent. Any solvent well known to those skilled in the art may be used, such as xylene, toluene, butanol, butyl acetate, propylene glycol monomethyl ether acetate, or the combination thereof, but not limited thereto. As an example of the catalyst, triethylamine can be used. It is also possible to carry out the reaction without additional solvents.

The second aspect according to the disclosure provides ketone-aldehyde modified resin, wherein the ketone-aldehyde modified resin comprises a ketone-aldehyde modified unsaturated polyester, a ketone-aldehyde modified unsaturated alkyd or the combination thereof, and wherein the ketone-aldehyde modified resin has ketone-aldehyde moieties.

Preferably, the ketone-aldehyde modified resin according to the invention is prepared by the process as described herein. For example, the ketone-aldehyde modified resin according to the invention is obtained by reacting unsaturated polyester-forming and/or unsaturated alkyd resin-forming monomer components with a ketone-aldehyde resin. The monomer components and the particular preferences are as described above.

In some preferred embodiments, the ketone-aldehyde moieties are derived from the product of reacting one or more cyclohexanone or derivations thereof with one or more aldehydes. More preferably, the cyclohexanone or derivations thereof is selected from the group consisting of: 4-tert-amylcyclohexanone, 2-sec-butylcyclohexanone, 2-tert-butylcyclohexanone, 4-tert-butylcyclohexanone, 2-methylcyclohexanone, 3,3,5-trimethylcyclohexanone, cyclohexanone and any mixture thereof. In some preferred embodiments, the aldehydes are selected from the group consisting of formaldehyde, paraformaldehyde, acetaldehyde, n-butyraldehyde, iso-butyraldehyde, dodecanal, benzaldehyde and any mixture thereof.

In some preferred embodiments, the ketone-aldehyde moieties have the following structure:

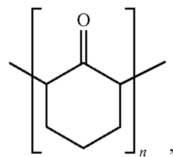

wherein n is an integer greater than or equal to 1. Preferably, n is not greater than 10. Optionally, in the ketone-aldehyde moieties, the hydrogen attached to the methylene carbon on the six-membered ring may be independently substituted with one or more substituents, for example with methyl, sec-butyl, tert-butyl, tert-amyl and the like. In some embodiments, the carbon adjacent to C═O on the six-membered ring may also be replaced by $CH_2OH$, or may be bridged by a methylene group with a carbon adjacent to C═O on another six-membered ring.

In some preferred embodiments, based on the total weight of ketone-aldehyde modified resin, the ketone-aldehyde modified resin has the ketone-aldehyde moieties in an amount of from 1 wt. % to 99 wt. %, preferably from 3 wt. % to 80 wt. %, more preferably from 5 wt. % to 60 wt. %, even more preferably from 8 wt. % to 30 wt. %.

In some preferred embodiments, the ketone-aldehyde modified resin according to the invention has a number average molecular weight (Mn) in a range of from 1,000 Da to 20,000 Da, such as in a range of from 1,500 Da to 15,000 Da, a range of from 1,800 Da to 10,000 Da, or a range of from 2,000 Da to 4,000 Da. A person of ordinary skill in the art will be able to select suitable methods and apparatuses to determine the number average molecular weight of the resin.

In some preferred embodiments, the ketone-aldehyde modified resin has a viscosity in a range of from 500 mPa·s to 6,000 mPa·s, preferably in a range of 800 mPa·s to 5,000 mPa·s, more preferably in a range of 1,000 mPa·s to 5,000 mPa·s, even more preferably in a range of 1,200 mPa·s to 3,500 mPa·s. The viscosity of the resin can be determined by using testing methods and apparatuses known in the art. The viscosity of the present invention is measured at 20° C. according to the test method of ISO 3219 unless otherwise stated.

In some preferred embodiments, the ketone-aldehyde modified resin has an acid value in a range of from 2 to 20 mg KOH/g, preferably in a range of from 3 to 15 mg KOH/g, more preferably in a range of from 4 to 10 mg KOH/g, even more preferably in a range of from 7 to 8 mg KOH/g. The acid value of the resin can be determined by using testing methods and apparatuses known in the art.

In some preferred embodiments, the ketone-aldehyde modified resin has a glass transition temperature (Tg) in a range of from 1 to 20° C., preferably in a range of from 2 to 18° C., more preferably in a range of from 3 to 15° C., even more preferably in a range of from 4 to 10° C. For example, the ketone-aldehyde modified resin has a glass transition temperature of about 5° C., about 6° C., about 7° C., about 8° C., or about 9° C. The Tg of the resin can be determined by using testing methods and apparatuses known in the art.

In some embodiments, the ketone-aldehyde modified resin according to the invention has a solid content of from 40 to 90%, preferably from 50 to 80%, more preferably from 65 to 75%.

The ketone-aldehyde modified resin of the present disclosure may be widely used in one-component coatings. The ketone-aldehyde modified resin of the present disclosure can also be used in combination with other coating components.

The third aspect of the present disclosure provides a coating composition, comprising the ketone-aldehyde modified resin as described above.

The amount of the ketone-aldehyde modified resin in the coating composition can vary over a wide range. In some embodiments, the amount of the ketone-aldehyde modified resin is in a range of from 10 to 100 wt. %, preferably from 20 to 90 wt. %, more preferably from 30 to 70 wt. %, even more preferably from 35 to 50 wt. %, based on the total weight of the coating composition.

The coating compositions of the present invention may also optionally comprise pigments, additional additives, solvents, or any combination thereof.

In some preferred embodiments, the pigments comprise carbon black powder, talc, or any combination thereof. The total amount of the pigments may be from 0 wt. % to 50 wt. %, for example, from 1 wt. % to 45 wt. %, from 2 wt. % to 40 wt. %, from 3 wt. % to 35 wt. %, from 4 wt. % to 30 wt %, from 5 wt. % to 25 wt. %, or from 10 wt. % to 20 wt. %, based on the total weight of the coating composition. Further preferably, the amount of each pigment is independently from 0 wt. % to 50 wt. %, from 1 wt. % to 40 wt. %, from 2 wt. % to 30 wt. %, from 3 wt. % to 20 wt %, or 4 wt. % to 15 wt. %, based on the total weight of the coating composition.

In the coating compositions of the present invention, optional additional additives may be those commonly used in coating compositions. Those additives do not adversely affect the coating composition or a cured coating resulting therefrom. Suitable additives include those agents which can, for example, improve the manufacturing, processing of the composition, enhance composition esthetics, improve a particular functional property or characteristics (for example, the adhesion to a substrate) of a coating composition or a cured coating resulting therefrom. Depending on the particular needs, the additives that may be present in the coating composition include, but not limited to, fillers, anti-skinning agents, driers, emulsifiers, pigments, anti-migration aids, antibacterial agents, chain extenders, lubricants, wetting agents, biocides, plasticizers, defoamers, colorants, waxes, antioxidants, anticorrosive agents, flow control agents, dispersants, adhesion promoters, UV stabilizers, pH adjusters, leveling agents or a combination thereof. The amount of each of optional ingredients is sufficient to achieve its intended purpose, but preferably such amount does not adversely affect the coating composition or the cured coating derived therefrom. Preferably, the additional additives include wetting and dispersing agents, leveling agents, adhesion promoters, antifoaming agents, rheological additives, or any combination thereof.

In a preferred embodiment, the coating composition of the present invention comprises additional additives in a range of from about 0 wt. % to about 30 wt. %, preferably from about 0.1 wt. % to about 25 wt. %, relative to the total weight of the coating composition. Particularly, the amount of each additional additive in coating composition is in a range of from 0.1 wt. % to 10.0 wt. %, for example 0.2 wt. %, 0.3 wt. %, 0.4 wt. %, 0.6 wt. %, 0.7 wt. %, 0.8 wt. %, 0.9 wt. %, 1 wt. %, 1.1 wt. %, 1.2 wt. %, 1.3 wt. %, 1.4 wt. %, 1.5 wt. %, 1.8 wt. %, 2.0 wt. %, 2.5 wt. %, 3.0 wt. %, 3.5 wt %, 4.0 wt. %, 4.5 wt. %, 5.0 wt. %, 6.0 wt. %, 8.0 wt. % or 9.0 wt. %, relative to the total weight of the coating composition.

In the present disclosure, the coating composition can be prepared by any suitable methods well known to those skilled in the art. For example, the coating composition can be prepared by adding all of the components to the container and then stirring the resulting mixture to obtain homogeneity. Alternatively, the coating composition can be prepared by firstly mixing some of the components and then adding the remaining components to form a homogeneous mixture.

According to the invention, the coating composition can be applied by conventional application methods known to those skilled in the art. The application methods include dip coating, spin coating, spray coating, curtain coating, brush coating, roll coating, and other application methods known in the art. In the present disclosure, a wet on dry application process may be used. Conveniently, the solvent in the coating composition can be removed by drying naturally or accelerated drying (for example, with heat), so that a coating is formed.

Thus, the disclosure also provides a coated article, having at least one surface on which the coating composition as described herein or the ketone-aldehyde modified resin as described herein is applied. The article according to the disclosure may comprise a substrate. The substrate may be any coatable material. A person skilled in the art would choose and determine a suitable material as the substrate according to actual needs. In some preferred embodiments, the article according to the invention may be wood substrate, wall, or metal substrate.

The inventors have surprisingly found that significantly improved fast drying effect is achieved by using the coating composition and/or the ketone-aldehyde modified resin of the present disclosure. The fast drying effect can be characterized by the following procedure: coating a ketone-aldehyde modified resin on a tin plate to form a film having a given thickness followed by drying the film at room temperature, and then measuring the drying time required for the film to reach a given hardness. In some preferred embodiments, when the coating composition and/or the ketone-aldehyde modified resin of the present disclosure are coated on a tin plate to form a film having a thickness of about 53 μm followed by drying the film at room temperature, the drying time required for the film to have a pendulum hardness of 13 is no greater than 5 hours, preferably no greater than 4.5 hours, and even more preferably no greater than 4 hours. The fast drying effect may also be characterized by the hardness of the film formed after coating the coating composition or the ketone-aldehyde modified resin for a given period of time. In some preferred embodiments, the coating composition and/or the ketone-aldehyde modified resin of the present disclosure may have a pendulum hardness of 15 or more, preferably 16 or more, more preferably 18 or more, even more preferably 20 or more, as measured by coating the ketone-aldehyde modified resin on a tin plate to form a film having a thickness of about 53 μm followed by drying the film at room temperature for 7 hours.

The ketone-aldehyde modified resin of the present disclosure has a significantly increased drying speed, while other properties such as gloss, adhesion, and the like are not significantly impaired. In particular, the ketone-aldehyde modified resin of the present disclosure does not exhibit an increase in glass transition temperature and molecular weight. Even more unexpectedly, the ketone-aldehyde modified resin of the present disclosure is capable of exhibiting a further reduced glass transition temperature and molecular weight.

At present, the curing mechanism of coatings is very complicated. Not intending to be bound by any theory, it is believed that the cyclohexanone structure may be associated with fast drying property. In the present disclosure, the ketone-aldehyde resin is introduced into alkyd resin or polyester resin by the unique chemical modification process, so that the cyclohexanone structural moieties in the ketone-aldehyde resin are distributed in the main chain and the side chain of the ketone-aldehyde modified resin. The compatibility between the cyclohexanone structure and each monomer unit is greatly improved. The extremely excellent compatibility between the cyclohexanone structure and each monomer unit allows the ketone-aldehyde modified resin of the present disclosure to not only maintain good gloss and the like, but also achieve a significantly improved fast drying effect. A qualitative improvement in the fast drying effect is achieved by using the process and the ketone-aldehyde-modified resin of the present disclosure.

The present disclosure is more specifically described by the following examples. These examples are for illustrative purposes only. Embodiments of the invention are not limited to these specific embodiments.

EXAMPLES

Unless otherwise noted, all parts, percentages, and ratios reported in the following examples are on a weight basis, and all reagents used in the examples are commercially available and used directly without further treatment.

Test Methods

Unless indicated otherwise, the following test methods were utilized in the Examples that follow.

Hydroxyl Value

The hydroxyl value of the resin was determined by titration according to ISO 2554.

Acid Value

The acid value of the resin was determined by titration according to GB/T 12008.5-2010.

Viscosity

The viscosity was measured at 20° C. according to the test method of ISO 3219.

Gloss

The 60° gloss of the cured coating was evaluated according to ASTM D523.

Tg

The glass transition temperature of the resin was tested by using the TA DSC Q2000 system.

Hardness

A resin or coating composition was coated on a tin plate to form a film having a thickness of 53 μm followed by drying the film at room temperature. After a period of drying, the pendulum hardness was tested.

Example 1: Preparation of Ketone-Aldehyde Modified Resin

KB120, which was purchased from Guangzhou Kuibang Chemical Co., Ltd., was used as ketone-aldehyde resin. Sample A and Sample B were prepared in accordance with the components and amounts as shown in Table 1 below. Sample A was a base alkyd resin without modification with a ketone-aldehyde resin. Sample B was an alkyd resin modified by a ketone-aldehyde resin.

TABLE 1

Components and amounts for preparing resins

| Raw materials (wt. %) | Sample A | Sample B |
|---|---|---|
| Ketone-aldehyde resin | 0 | 10 |
| Oleic acid | 32.228 | 29.005 |
| Pentaerythritol | 20.8 | 18.72 |
| Phthalic anhydride | 31.872 | 28.685 |
| Benzoic acid | 5.833 | 5.25 |
| Neopentyl glycol | 9.267 | 8.34 |
| Total | 100 | 100 |

Under a nitrogen atmosphere, the ketone-aldehyde resin, oleic acid, pentaerythritol, phthalic anhydride, benzoic acid and neopentyl glycol were added to a four-necked flask equipped with a thermometer, an overhead stirrer, an air inlet and a distillation apparatus at room temperature. The mixture was heated to 160-220° C. and the resulting water was removed from the mixture by azeotropic distillation. When the acid value was less than 20 mg KOH/g, the reaction mixture was cooled.

In addition, as a control, Sample C was also prepared, which was a physical mixture of 90 wt. % of Sample A and 10 wt. % of a ketone-aldehyde resin.

The properties of the resin samples A-C were characterized. The results were shown in Table 2 below.

TABLE 2

Properties of the resins

| Properties of resins | Sample A | Sample B | Sample C |
|---|---|---|---|
| Mn/Pd | 4198/6.49 | 2518/3.51 | 2922/4.53 |
| Viscosity of resins (mPa · s) | 4000 | 1900 | 7400 |
| Solid content (%) | 74.2 | 71.9 | 74.3 |
| Acid value | 6.9 | 7.5 | 9.2 |
| Tg (° C.) | 18.1 | 5.1 | 15.7 |

Example 2: Preparation of Ketone-Aldehyde Modified Resin

Sample A, Sample B, and Sample C were used as the resin for formulating coating compositions, respectively. Samples 1-3 of coating compositions were prepared in accordance with the components and amounts shown in Table 3.

Each coating composition was coated on a tin plate, and the properties of each coating film were measured. The results were also shown in Table 3.

TABLE 3

Results of the components and amounts for formulating coating compositions and the properties of the coating films

| Raw materials (wt. %) | | Sample 1 | Sample 2 | Sample 3 |
|---|---|---|---|---|
| Resin Sample A | | 40 | — | — |
| Resin Sample B | | — | 40 | — |
| Resin Sample C | | — | — | 40 |
| BYK170 | | 0.5 | 0.5 | 0.5 |
| BYK388 | | 1 | 1 | 1 |
| Sago-7522 | | 0.2 | 0.2 | 0.2 |
| BYK051 | | 0.5 | 0.5 | 0.5 |
| Bengel958 | | 0.1 | 0.1 | 0.1 |
| Carbon black powder | | 4 | 4 | 4 |
| Talc | | 15 | 15 | 15 |
| Butyl acetate | | 25.7 | 25.7 | 25.7 |
| Xylene | | 13 | 13 | 13 |
| Total | | 100 | 100 | 100 |
| Tested properties | | | | |
| Thickness of dry film | | 44-53 μm | 42-55 μm | 46-58 μm |
| 60° gloss | | 89-90 | 86-88 | 91-93 |
| Pendulum hardness | 1 h | 3 | 4 | 1 |
| | 2 h | 5 | 8 | 5 |
| | 3 h | 8 | 11 | 8 |
| | 4 h | 10 | 13 | 10 |
| | 5 h | 11 | 15 | 11 |
| | 6 h | 12 | 18 | 12 |
| | 7 h | 13 | 20 | 13 |

From the above results, it can be seen that when the coating composition containing the ketone-aldehyde modified resin of the present disclosure was used, the drying speed was remarkably increased and the gloss was not significantly impaired, as compared with the unmodified resin as well as the physical mixture of the resins. Even, the ketone-aldehyde modified resin of the present disclosure has significantly reduced molecular weight, viscosity and Tg.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for preparation of a ketone-aldehyde modified resin, comprising the steps of:

providing an unsaturated polyester-forming and/or unsaturated alkyd resin-forming monomer components;

providing a ketone-aldehyde resin, reacting the monomer component with the ketone-aldehyde to obtain the ketone-aldehyde modified resin, wherein the monomer components comprise (a) 20 to 60 wt. % of polyols; (b) 20 to 60 wt. % of polyacids; (c) 0 to 50 wt. % of fatty acids, fatty acid esters or naturally occurring oils; and (d) 0 to 15 wt. % of monofunctional acids other than fatty acids, wherein based on the total weight of the monomer components and the ketone-aldehyde resin, the ketone-aldehyde resin is present in an amount of from 1 wt. % to 99 wt. %, wherein the wt. % is relative to the total weight of components of (a), (b), optional (c), and optional (d); and at least one of components (b) and (c) is unsaturated;

wherein the molar equivalent ratio of the polyols to the sum of the polyacids, optionally the fatty acids, fatty acid esters or naturally occurring oils and optionally the monofunctional acids is in a range of 1:4 to 4:1.

2. The process according to claim 1, wherein the polyols are selected from the group of ethylene glycol, diethylene glycol, triethylene glycol, propylene glycol, dipropylene glycol, 1,2-butanediol, 1,3-butanediol, 1,4-butanediol, pentanediol, pentaerythritol, trimethylolpropane, trimethylolethane, glycerol, dipentaerythritol, and combinations thereof.

3. The process according to claim 1, wherein the polyacids comprise unsaturated polyacids and optional saturated polyacids, wherein the unsaturated polyacids are selected from the group of fumaric acid, maleic acid, maleic anhydride, methyl fumaric acid, methylmaleic acid, dichloromaleic acid, itaconic acid and combinations thereof; and the optional saturated polyacids are selected from the group of phthalic acid and anhydrides thereof, isophthalic acid, terephthalic acid, succinic acid, adipic acid, suberic acid, azelaic acid, sebacic acid, tetrachlorophthalic acid, tetrabromophthalic acid, trimellitic acid, trimellitic anhydride, pyromellitic acid, pyromellitic dianhydride, and combinations thereof.

4. The process according to claim 1, wherein the monofunctional acids are selected from the group of benzoic acid, acetic acid, propionic acid, t-butylbenzoic acid, and combinations thereof.

5. The process according to claim 1, wherein the fatty acids, fatty acid esters or naturally occurring oils comprise linoleic acid, linolenic acid, oleic acid, arachidonic acid, eleostearic acid, tall oil fatty acid, catalpic acid, dehydrated ricinoleic acid, castor oil, linseed oil, soybean oil, palm oil, safflower oil, or the esters thereof.

6. The process according to claim 1, wherein the ketone-aldehyde resin has a hydroxyl value of not higher than 300 mg KOH/g resin.

7. The process according to claim 1, wherein the ketone-aldehyde resin has a softening point of about 80 to 130° C.

8. The process of claim 1, wherein the ketone-aldehyde modified resin has ketone-aldehyde moieties and wherein the ketone-aldehyde moieties are derived from the product of reacting one or more cyclohexanone or derivations thereof with one or more aldehydes.

9. The process according to claim 8, wherein the cyclohexanone or derivations thereof is selected from the group consisting of 4-tert-amylcyclohexanone, 2-sec-butylcyclohexanone, 2-tert-butylcyclohexanone, 4-tert -butylcyclohexanone, 2-methylcyclohexanone, 3,3,5-trimethylcyclohexanone, cyclohexanone and any mixture thereof and the aldehydes are selected from the group consisting of formaldehyde, paraformaldehyde, acetaldehyde, n-butyraldehyde, iso-butyraldehyde, dodecanal, benzaldehyde and any mixture thereof.

10. The process according to claim 8, wherein the ketone-aldehyde modified resin has number average molecular weight (Mn) of from 1000 Da to 20,000 Da.

11. The process according to claim 8, wherein the ketone-aldehyde modified resin has a viscosity in a range of from 500 mPa·s to 6,000 mPa·s.

12. The process according to claim 8, wherein the ketone-aldehyde modified resin has a solid content of from 40 to 90%.

13. A coating composition, comprising:

the ketone-aldehyde modified resin obtained by the process of claim 5;

optionally, at least one pigment; and optionally, at least one solvent.

14. A coated article comprising a substrate; and a coating formed on the substrate, wherein the coating is derived from a coating composition comprising the ketone-aldehyde modified resin of claim 13.

15. The coated article of claim 14, wherein the substrate is metal, and further wherein the coating has film thickness of about 53 μm and pendulum hardness of 13.

* * * * *